June 29, 1948.  R. W. LEASURE  2,444,136
CARTRIDGE RIM GAUGE
Filed Oct. 25, 1946
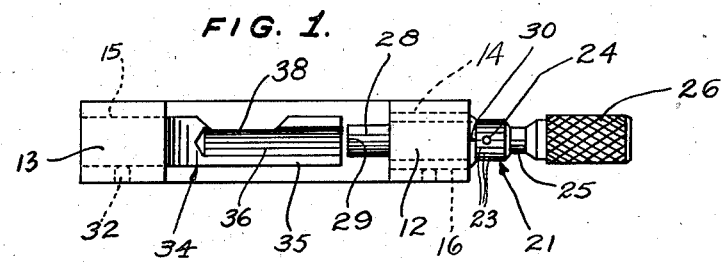
FIG. 1.
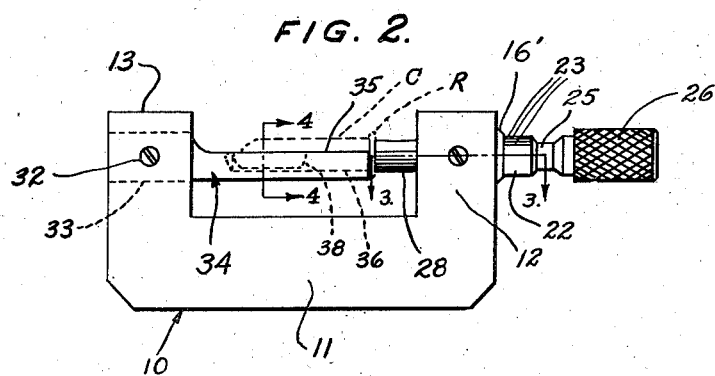
FIG. 2.
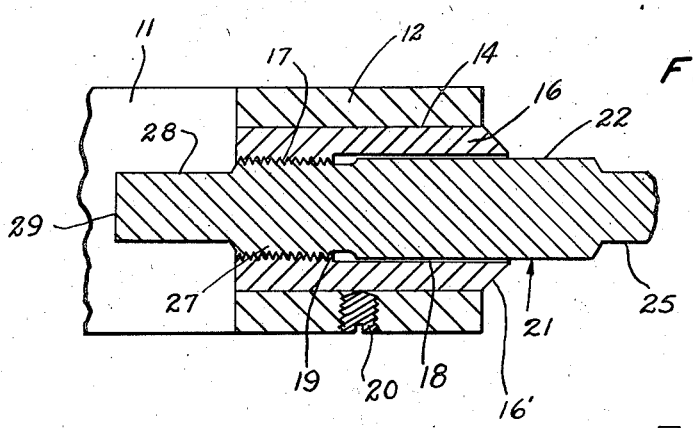
FIG. 3.
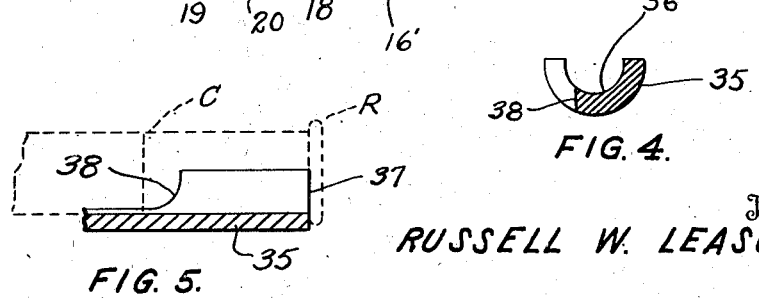
FIG. 4.
FIG. 5.
Inventor
RUSSELL W. LEASURE,
By McMorrow, Berman & Davidson
Attorneys Patented June 29, 1948

2,444,136

UNITED STATES PATENT OFFICE 2,444,136

CARTRIDGE RIM GAUGE

Russell W. Leasure, Vandergrift, Pa.

Application October 25, 1946, Serial No. 705,518

3 Claims. (Cl. 33—164)

My invention relates to a gauge for measuring the relative thickness of cartridge rims and the like.

An important object of my invention is to provide an accurate, simple, and convenient gauge for measuring the relative rim thickness of cartridges; which gauge is particularly useful to rifle shooters for separating the cartridges to eliminate those having rims which are too thick or too thin.

Other objects and advantages of the invention will be apparent during the course of the following description.

In the accompanying drawings, forming a part of this application, and in which like numerals are employed to designate like parts throughout the same, Figure 1 is a plan view of the gauge embodying my invention, Figure 2 is a side elevation of the gauge, illustrating the gauge in use, Figure 3 is an enlarged fragmentary horizontal section taken on line 3—3 of Figure 2, Figure 4 is a vertical detail section taken on line 4—4 of Figure 2, and, Figure 5 is an enlarged sectional detail of the cartridge support pin.

In the drawings, where for the purpose of illustration is shown a preferred embodiment of my invention, the numeral 10 designated a gauge frame which is U-shaped, and comprising a main longitudinal section 11, and upstanding end extensions or arms 12 and 13, which have longitudinal openings or bores 14 and 15 respectively, which are preferably in axial alignment.

Mounted within the bore 14 of the arm 12 is a cylindrical tubular bushing 16 which is internally screw threaded at its forward end as shown at 17, the screw threads 17 extending rearwardly and terminating near the longitudinal center of the bushing. The screw threads 17 lead into an enlarged bore 18, and the junction of the screw threads 17 with the bore 18 forms a transverse stop shoulder 19. The bushing 16 is secured within the bore 14 by means of a set screw 20, or the like, having screw threaded engagement with the arm 12. The bushing 16 is adjustable longitudinally within the bore 14, and has an outer beveled end 16'.

Mounted within the bushing 16 is a gauge spindle 21, including a smooth shank 22 adapted to move longitudinally within the bore 18. This shank 22 is provided with circumferentially spaced parallel graduations or scribe lines 23, and a reference point 0 designated by the numeral 24, in Figure 1 of the drawings. The spindle 21 has an outer reduced portion 25, and this portion 25 carries a suitable handle or knob extension 26, for rotating the spindle. The spindle 21 further includes a screw threaded portion 27 for engagement with the screw threads 17, and this saw threaded portion 27 carries an inner cylindrical end extension or gauge pin 28 having a flat end 29, arranged precisely at right angles to the longitudinal axis of the spindle 21. A heavy reference scribe line 30 is provided on the outer beveled end 16' of the bushing 16.

Rigidly secured within the bore 15, by means of a set screw 32, or the like, is the cylindrical end portion 33 of a cartridge support pin 34. This cartridge support pin 34 has an inwardly extending longitudinal extension 35, which is substantially semicircular in transverse cross section, as shown in Figure 4. The extension 35 has an elongated substantially semicircular recesses 36, for receiving a cartridge C having its rim R inspected. The extension 35 is arranged in opposed relation to and terminates near the end 29 of the gauge pin 28, and has an outer end surface 37, which is precisely at right angles to the longitudinal axis of the spindle 21. The support pin extension 35 has an elongated side recess 38, formed near the inner end of the cartridge recess 36, to facilitate removal of the cartridge from the recess 36.

In use, the cartridge C to be inspected is placed in the recess 36 of the pin extension 35 as illustrated in Figure 2 of the drawings. The inner transverse surface of the cartridge rim R is brought to bear against the square surface 37 of the extension 35. The operator turns the knob 26, turning the spindle 21, moving the spindle inwardly longitudinally, until the end 29 of the gage pin 28 engages against the outer transverse surface of the cartridge rim R. If the cartridge rim being inspected is of the proper thickness, the reference scribe line 30 will be directly aligned with the 0 reference point, designated by the numeral 24, and shown clearly in Figure 1. If the cartridge rim is too thick or too thin the 0 reference point will not be in alignment with the reference scribe line 30, and the scribe lines 23 on either side of the 0 reference point will indicate the amount of variation, in either direction, from the correct thickness of the rim.

To adjust the 0 reference point, so that it will be in alignment with the reference scribe line 30, when a rim of correct thickness is being inspected, the set screw 20 is loosened, and the bushing 16 is adjusted in the bore 14, while the end 29 of the gauge pin 28 is maintained in engagement against a standard cartridge rim, or the like, which is known to be of precisely correct thickness. When the reference scribe line 30 is thus aligned with the 0 reference point, the set screw 20 is tightened against the bushing 16. The gauge will then accurately indicate whether cartridge rims are of the proper thickness, too thick, or too thin. Obviously this gauge can be made in different sizes to accommodate cartridges of different calibres. The scribe lines 23 can be spaced and calibrated to indicate the amount of variation in rim thickness as desired. For example, each scribe line 23 may indicate .001 of an inch variation.

It is to be understood that the form of my invention herewith shown and described is to be taken as a preferred example of the same, and that various changes in the shape, size, and arrangement of parts may be resorted to, without departing from the spirit of my invention, or the scope of the subjoined claims.

Having thus described my invention, what I claim is:

1. A gauge, comprising a frame including arms having openings, a spindle mounted within one of the openings and adapted to move longitudinally, a stationary support pin secured within the other opening and having a recess for receiving a cartridge, and means to move the spindle into close spaced relation with the support pin to measure the thickness of the cartridge rim.

2. A gauge, comprising a U-shaped frame including arms having openings, an internally screw threaded bushing adjustably mounted within one of said openings, a screw threaded spindle for engaging within the bushing and adapted to be turned to move longitudinally of the bushing, a stationary support pin rigidly secured within the other of said openings and having a longitudinal recess for receiving a cartridge, means for turning the spindle to move the same into close spaced relation with the support pin, and means to clamp the bushing in the selected adjusted position.

3. A gauge, comprising a U-shaped frame including arms having openings, an internally screw threaded bushing adjustably mounted within one of said openings, a screw threaded spindle for engagement within the bushing and adapted for movement longitudinally of the bushing, a support pin rigidly secured within the other opening and having an elongated recess for receiving a cartridge and a side recess to facilitate removal of the cartridge, means for turning the spindle to move the same into close spaced relation with the support pin, means for indicating the extent of longitudinal movement of the spindle, and a set screw for clamping the bushing in the selected adjusted position.

RUSSELL W. LEASURE.